US008566406B2

(12) United States Patent
Carvalho Neto et al.

(10) Patent No.: US 8,566,406 B2
(45) Date of Patent: Oct. 22, 2013

(54) FILTERING OF ELECTRONIC MAIL MESSAGES DESTINED FOR AN INTERNAL NETWORK

(75) Inventors: Mayerber L. Carvalho Neto, Redmond, WA (US); Chandresh K. Jain, Sammamish, WA (US); Mayank Mehta, Redmond, WA (US); Mihai Costea, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 397 days.

(21) Appl. No.: 12/687,259

(22) Filed: Jan. 14, 2010

(65) Prior Publication Data

US 2011/0173272 A1 Jul. 14, 2011

(51) Int. Cl.
*G06F 15/16* (2006.01)
(52) U.S. Cl.
USPC .......................................... 709/206; 709/207
(58) Field of Classification Search
None
See application file for complete search history.

(56) References Cited

U.S. PATENT DOCUMENTS

| | | | |
|---|---|---|---|
| 6,052,709 A | 4/2000 | Paul | |
| 6,301,608 B1* | 10/2001 | Rochkind | 709/206 |
| 6,868,436 B1* | 3/2005 | Fleming, III | 709/206 |
| 7,007,068 B2* | 2/2006 | Morkel | 709/206 |
| 7,181,495 B2 | 2/2007 | Skladman | |
| 7,433,923 B2 | 10/2008 | Adkins | |
| 7,454,467 B2* | 11/2008 | Girouard et al. | 709/206 |
| 7,543,076 B2 | 6/2009 | Mehr | |
| 7,636,944 B2* | 12/2009 | Raikar | 726/22 |
| 2003/0009698 A1 | 1/2003 | Linderman | |
| 2004/0255122 A1* | 12/2004 | Ingerman et al. | 713/176 |
| 2009/0019126 A1* | 1/2009 | Adkins | 709/206 |

FOREIGN PATENT DOCUMENTS

WO WO 2005119994 A1 12/2005

OTHER PUBLICATIONS

Ernesto Damiani et al., "P2P-Based Collaborative Spam Detection and Filtering"—Published Date: 2004, pp. 1-8. http://citeseerx.ist.psu.edu/viewdoc/download?doi=10.1.1.59.123&rep=rep1&type=pdf.

Alan Gray et al., "Personalised, Collaborative Spam Filtering"—Published Date: 2004, pp. 1-8. http://citeseerx.ist.psu.edu/viewdoc/download?doi=10.1.1.59.8557&rep=rep1&type=pdf.

* cited by examiner

*Primary Examiner* — Mohamed Ibrahim
(74) *Attorney, Agent, or Firm* — Merchant & Gould

(57) ABSTRACT

A perimeter network may be utilized to filter electronic mail messages destined for an internal network. A computer may be utilized to monitor an electronic mail mailbox for changes to a safe recipients list and/or a blocked senders list. The computer may further be utilized to automatically copy the safe recipients list and/or the blocked senders list to a network directory in the internal network. The computer may further be utilized to automatically send the safe recipients list and/or the blocked senders list to a network directory in the perimeter network for utilization by one or more agents executing on a computer in the perimeter network. The one or more agents may be configured to utilize the safe recipients list and/or the blocked senders list to filter electronic mail messages received by the perimeter network which are destined for delivery to the internal network.

20 Claims, 4 Drawing Sheets

FILTERING OF ELECTRONIC MAIL MESSAGES DESTINED FOR AN INTERNAL NETWORK

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Perimeter computer networks, utilize various content filtering techniques to minimize unwanted electronic mail ("e-mail") messages (i.e., "spam") from being received by internal computer networks, such as an organization's mail system. Current content filtering techniques include filtering e-mail at the perimeter network by using algorithms to evaluate and assign "spam confidence levels" to incoming e-mail messages to identify spam. When a spam confidence level assigned to an incoming message reaches a configured threshold, the message is rejected. However, perimeter network content filtering algorithms which utilize spam confidence levels do not always accurately distinguish legitimate e-mail messages from spam thereby resulting in the occurrence of false positives (i.e., the identification of legitimate e-mail messages as spam). As a result, legitimate e-mail messages are prevented from being delivered to the internal network. Moreover, while more reliable content filtering techniques exist within internal networks, these internal network filtering techniques are not easily applied to the perimeter network. For example, safe recipients/blocked sender lists are typically only stored inside of internal networks and thus are unavailable for use by the perimeter network without engaging in the time consuming process of manually copying these lists from mailboxes associated with each user in the internal network. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for filtering, by a perimeter network, electronic mail messages destined for an internal network. A computer may be utilized to monitor an electronic mail mailbox for changes to a safe recipients list and/or a blocked senders list. The computer may further be utilized to automatically copy the safe recipients list and/or the blocked senders list to a network directory in the internal network. The computer may further be utilized to automatically send the safe recipients list and/or the blocked senders list to a network directory in the perimeter network for utilization by one or more agents executing on a computer in the perimeter network. The one or more agents may be configured to utilize the safe recipients list and/or the blocked senders list to filter electronic mail messages received by the perimeter network which are destined for delivery to the internal network.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are provided for filtering, by a perimeter network, electronic mail messages destined for an internal network. A computer may be utilized to monitor an electronic mail mailbox for changes to a safe recipients list and/or a blocked senders list. The computer may further be utilized to automatically copy the safe recipients list and/or the blocked senders list to a network directory in the internal network. The computer may further be utilized to automatically send the safe recipients list and/or the blocked senders list to a network directory in the perimeter network for utilization by one or more agents executing on a computer in the perimeter network. The one or more agents may be configured to utilize the safe recipients list and/or the blocked senders list to filter electronic mail messages received by the perimeter network which are destined for delivery to the internal network.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
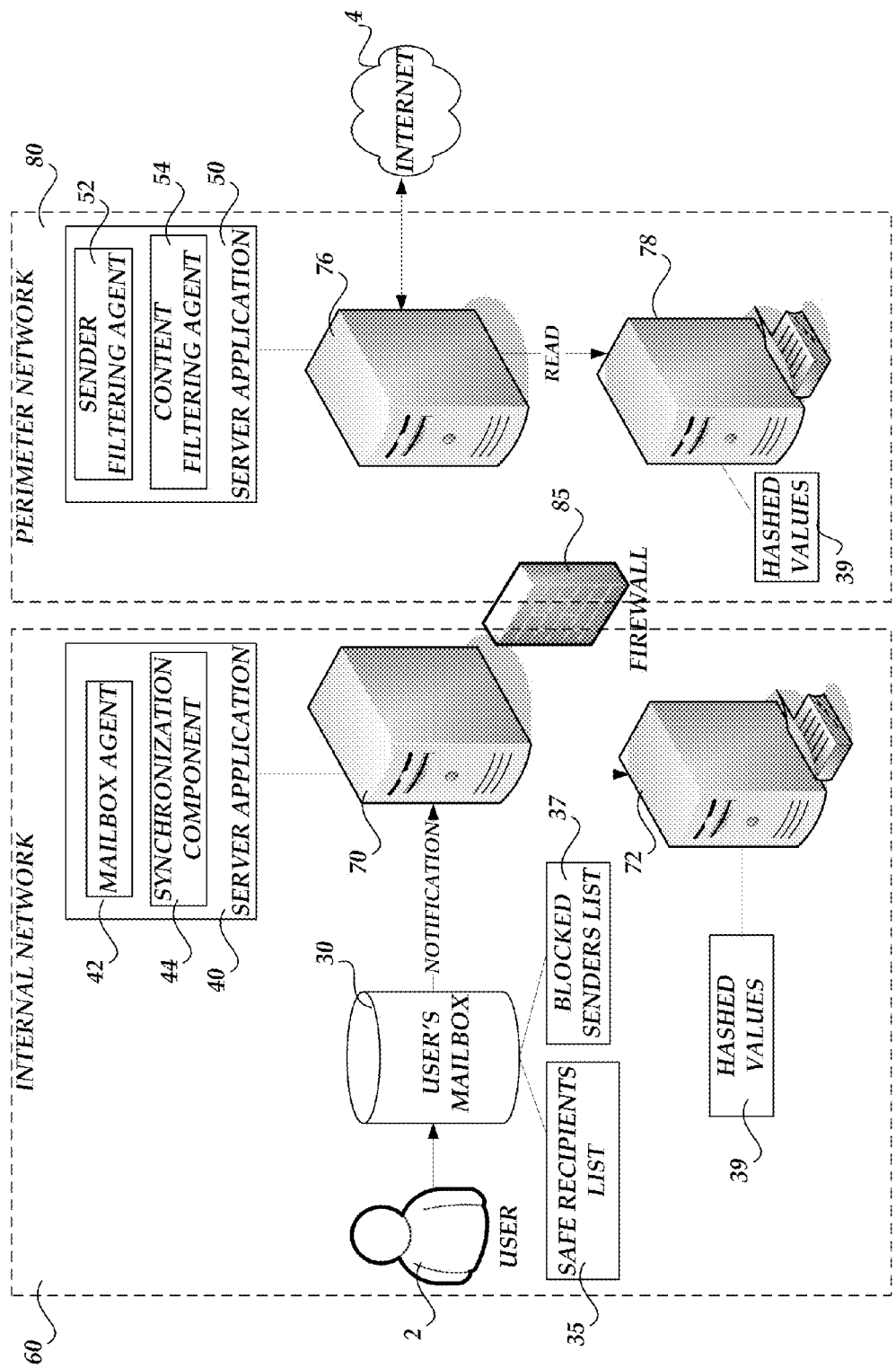
FIG. 1 is a block diagram illustrating a network architecture for filtering, by a perimeter network, electronic mail messages destined for an internal network, in accordance with various embodiments.

Referring now to the drawings, in which like numerals represent like elements through the several figures, various aspects of the present invention will be described. FIG. 1 is a block diagram illustrating a network architecture for filtering, by a perimeter network, electronic mail messages destined for an internal network, in accordance with various embodiments. The network architecture includes an internal network 60 which is in communication with a perimeter network 80 through a firewall 85. In accordance with an embodiment, the internal network 60 may comprise a local area network, such as an organizational or corporate network, which is utilized for sending and receiving electronic mail messages. The perimeter network 80 may comprise an Internet-facing local area network which is in communication with both the internal network 60 and the Internet 4.

The internal network 60 may include a user 2, a user's mailbox 30, a mail server 70 and a directory server 72. In accordance with an embodiment, the user 2 may comprise a client computer in the internal network 60 which is utilized for sending and receiving electronic mail messages. The electronic mail messages may be stored in a message storage system such as the user's mailbox 30. In addition to storing electronic mail messages, the user's mailbox 30 may also be utilized for storing a safe recipients list 35 and a blocked senders list 37. As known to those skilled in the art, safe recipients and blocked senders lists may be utilized to filter electronic mail messages in a user's electronic mail mailbox. In particular, a safe recipients list may include a list of user specified electronic mail addresses to which messages are always allowed (and thus not subject to content or "spam" filtering). For example, for a user's safe recipients list having the address "my-safe-recipient@foo.com" would result in electronic mail messages sent to "my-safe-recipient@foo.com" always being allowed. As another example, a user may choose to specify the "To:" address of a subscribed newsgroup in a safe recipients list to enable the user to always receive electronic mail messages sent to the newsgroup and thereby bypass any spam filtering utilized by a perimeter network. Conversely, a blocked senders list may include a list of user specified electronic mail addresses from which messages are never allowed. In particular, messages sent to electronic mail addresses in the blocked senders list are always rejected and thus prevented from reaching the user's inbox, irrespective of any spam filtering which may be utilized at the perimeter network 80.

The mail server 70 may include a server application 40 for providing electronic mail, calendaring, contacts and tasks, and data storage services. In accordance with an embodiment, the server application 40 may comprise the EXCHANGE SERVER messaging and collaborative software application which is manufactured by MICROSOFT CORPORATION of Redmond, Wash. It should be appreciated that other messaging and/or collaborative software applications from other manufacturers may also be utilized in accordance with the various embodiments described herein. The server application 40 may include a mailbox agent 42 and a synchronization component 44.

In accordance with an embodiment, the mailbox agent 42 may comprise software code configured to actively monitor the user's mailbox 30 for changes to the safe recipients list 35 and the blocked senders list 37 and then copy the lists 35 and 37 in an encrypted format, to the directory server 72. For example, in accordance with an embodiment, the mailbox agent 42 may be configured to generate a four byte hash value for each entry in either the safe recipients list 35 or the blocked senders list 37 and store the resulting hashes as attributes of a user's object in the directory server 72. The hash values of the safe recipients list 35 may then be stored into an msExchSafeRecipientsHash attribute and the hash values of the blocked senders list 37 may be stored into an msExchBlockedSendersHash attribute with the user object in an active directory in the directory sever 72. In one embodiment, the active directory may comprise the ACTIVE DIRECTORY technology developed by MICROSOFT CORPORATION of Redmond, Wash. It should be appreciated that other methods other than the hash technique discussed above may be utilized to encrypt the safe recipients list 35 and the blocked senders list 37, in accordance with various embodiments. It should further be appreciated that, in accordance with other embodiments, the lists 35 and 37 do not undergo any encryption at all but rather are copied to the directory server 72 by the mailbox agent 42 "in the clear" in order to realize increased performance benefits in the internal network 60.

The mailbox agent 42 may monitor the user's mailbox 30 by registering for change notifications with the user's mailbox 30 such that when a change in the lists 35 and/or 37 occurs, the mailbox agent 42 receives a notification from the user's mailbox 30. In accordance with an embodiment, upon receiving the notification from the user's mailbox 30, the mailbox agent 42 updates the ACTIVE DIRECTORY in the directory server 72 with new values for the msExchSafeRecipientsHash and the msExchBlockedSendersHash attributes, discussed above.

In accordance with an embodiment, the synchronization component 44 may comprise software code configured to synchronize the lists 35 and 37 between a directory in the internal network (i.e., the directory server 72) and a directory in the perimeter network 80 (i.e., directory server 78). It should be understood that synchronization component 44 is not limited to only synchronizing the lists 35 and 37 but may also synchronize other information to the perimeter network 80 as well.

In accordance with an embodiment, the synchronization component 44 may be configured to copy encrypted values representing the lists 35 and/or 37 to the directory server 78. In accordance with an embodiment, the synchronization component 44 may comprise the "EdgeSync" synchronization technology developed by MICROSOFT CORPORATION of Redmond, Wash. In accordance with a non-limiting illustrative embodiment, the EdgeSync technology may be utilized to synchronize objects and attributes between a directory inside the internal network 60 and a directory in the perimeter network 80 utilizing the ACTIVE DIRECTORY Application Mode (ADAM) technology developed by MICROSOFT CORPORATION of Redmond, Wash. As a non-limiting example, the synchronization component 44 may be configured to run periodically and pick the msExchSafeRecipeintsHash and the msExchBlockedSendersHash attributes from the internal network 60 and synchronize them to a perimeter network directory (i.e., an ADAM directory stored on the directory server 78). It should be appreciated that other synchronization technologies from other developers may also be utilized in accordance with the various embodiments described herein.

The directory server 72 may include hash values 39 representing entries in the safe recipients list 35 and the blocked senders list 37. As discussed above, the synchronization component 42 may be configured to copy the hash values 39 to the directory server 78 in the perimeter network 80. As discussed above, in accordance with an embodiment, the directory server 72 may include the ACTIVE DIRECTORY technology developed by MICROSOFT CORPORATION of Redmond, Wash. It should be appreciated that other directory technologies from other developers may also be utilized in accordance with the various embodiments described herein.

The perimeter network 80 may include a server 76 and the directory server 78. The server 76 may include a server application 50 for providing electronic mail, calendaring, contacts and tasks, and data storage services. In accordance with various embodiments, the server application 50 may comprise the EXCHANGE SERVER messaging and collaborative software application which is manufactured by MICROSOFT CORPORATION of Redmond, Wash. It should be appreciated that other messaging and/or collaborative software applications from other manufacturers may also be utilized in accordance with the various embodiments described herein. The server application 50 may include a sender filtering agent 52 and a content filtering agent 54.

In accordance with an embodiment, the sender filtering agent 52 may comprise software code configured to access the directory server 78 and read the hash values 39 copied from the directory server 72 in the internal network 60 by the synchronization component 44. In particular, the sender filtering agent 52 may be configured to generate hashes of addresses in the electronic mail messages received in the perimeter network 80 (e.g., from the Internet 4), compare the result with the hash values 39 corresponding to the addresses in the blocked senders list 37, which were copied from the directory server 72, and then reject electronic mail messages destined for recipients in the internal network 60 if a match is found as a result of the comparison.

In accordance with an embodiment, the content filtering agent 54 may comprise software code configured to access the directory server 78 and read the hash values 39 copied from the directory server 72 in the internal network 60 by the synchronization component 44. In particular, the content filtering agent 54 may be configured to generate hashes of addresses in the electronic mail messages received in the perimeter network 80 (e.g., from the Internet 4), compare the result with the hash values 39 corresponding to the addresses in the safe recipients list 35, which were copied from the directory server 72, and then bypass spam filtering for electronic mail messages destined for recipients in the internal network 60 if a match is found as a result of the comparison.

It should be appreciated by those skilled in the art that encryption methods other than the hash generation technique for the safe recipients and blocked senders lists 35, 37, discussed above, may be utilized in accordance with other embodiments. For example, the mailbox agent 42 may be configured to encrypt the safe recipients and blocked senders lists 35 and 37 and the sender and content filtering agents 52 and 54 may be configured to retrieve and decrypt the lists 35 and 37 after the lists 35 and 37 have been copied to the directory server 72 by the synchronization component 44. Alternatively, as discussed above, the lists 35 and 37 may not undergo any encryption at all but rather are copied to the directory server 72 by the mailbox agent 42 "in the clear" in order to realize increased performance benefits in the internal network 60.

The directory server 78 may include the hash values 39, representing entries in the safe recipients list 35 and the blocked senders list 37, which have been copied from the directory server 72 by the synchronization component 44. In accordance with an embodiment, the directory server 78 may include the ACTIVE DIRECTORY and ACTIVE DIRECTORY APPLICATION MODE ("ADAM") technologies developed by MICROSOFT CORPORATION of Redmond, Wash. It should be appreciated that other directory technologies from other developers may also be utilized in accordance with the various embodiments described herein.

Exemplary Operating Environment

Figure 2:
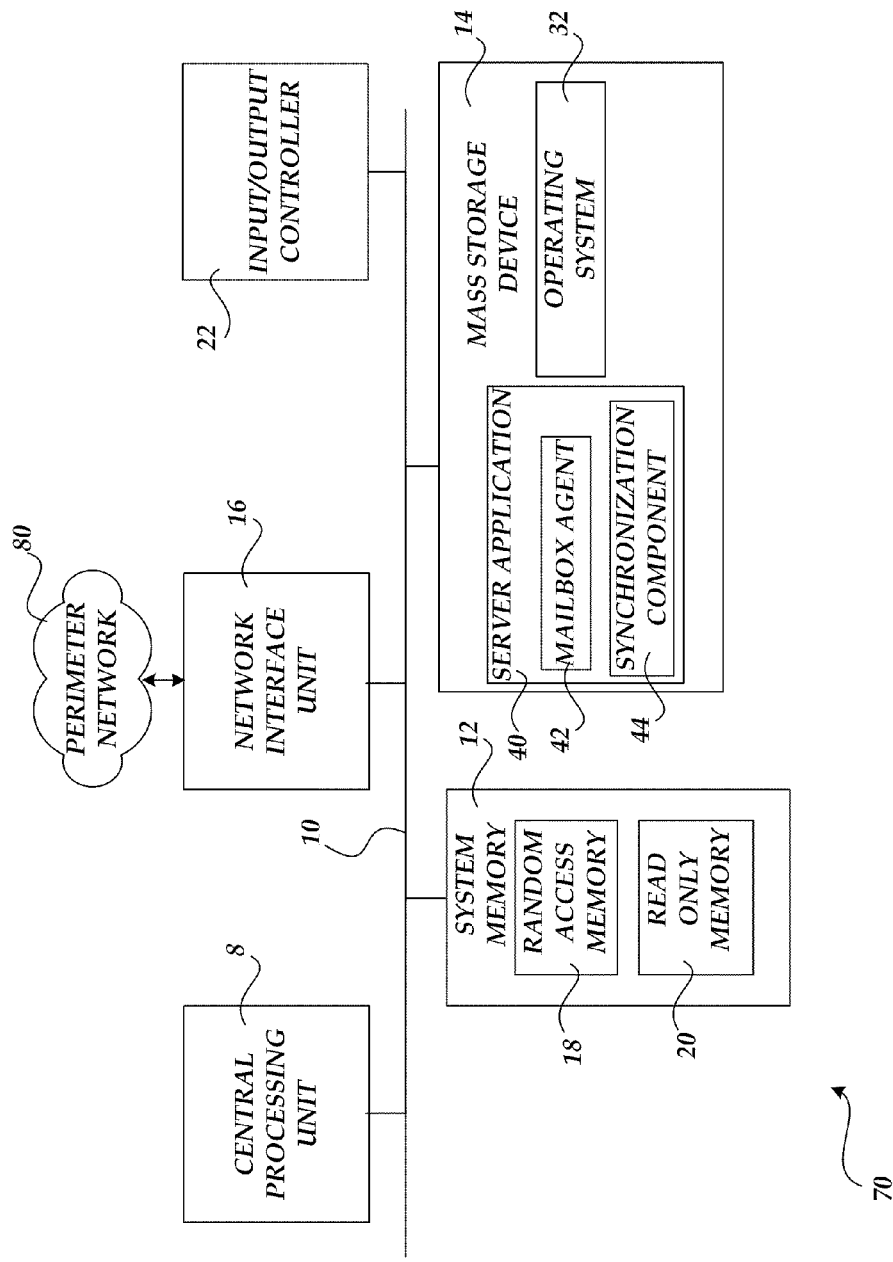
FIG. 2 is a block diagram illustrating a server computer which may be utilized for synchronizing data retrieval from a plurality of data sources on a mobile computing device, in accordance with various embodiments.

Referring now to FIG. 2, the following discussion is intended to provide a brief, general description of a suitable computing environment in which various illustrative embodiments may be implemented. While various embodiments will be described in the general context of program modules that execute in conjunction with program modules that run on an operating system on a server computer, those skilled in the art will recognize that the various embodiments may also be implemented in combination with other types of computer systems and program modules.

Generally, program modules include routines, programs, components, data structures, and other types of structures that perform particular tasks or implement particular abstract data types. Moreover, those skilled in the art will appreciate that the various embodiments may be practiced with a number of computer system configurations, including hand-held devices, multiprocessor systems, microprocessor-based or programmable consumer electronics, minicomputers, mainframe computers, and the like. The various embodiments may also be practiced in distributed computing environments where tasks are performed by remote processing devices that are linked through a communications network. In a distributed computing environment, program modules may be located in both local and remote memory storage devices.

FIG. 2 shows the mail server 70 which may comprise any type of computer capable of executing one or more application programs. The mail server 70 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20.

The mail server 70 may further include a mass storage device 14 for storing an operating system 32 and the server application 40 (which comprises the mailbox agent 42 and the synchronization component 44 discussed above). In accordance with various embodiments, the operating system 32 may be suitable for controlling the operation of a networked computer, such as the WINDOWS operating systems from MICROSOFT CORPORATION of Redmond, Wash. The mass storage device 14 is connected to the CPU 8 through a mass storage controller (not shown) connected to the bus 10. The mass storage device 14 and its associated computer-readable media provide non-volatile storage for the mail server 70. Although the description of computer-readable media contained herein refers to a mass storage device, such as a hard disk or CD-ROM drive, it should be appreciated by those skilled in the art that computer-readable media can be any available media that can be accessed or utilized by the mail server 70. By way of example, and not limitation, computer-readable media may comprise computer storage media and communication media.

Computer storage media includes volatile and non-volatile, removable and non-removable hardware storage media implemented in any physical method or technology for the storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, which can be used to store the desired information and which can be accessed by the client mobile computing device2. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as a computer program product.

According to various embodiments of the invention, the mail server 70 may operate in a networked environment using logical connections to remote computers through the perimeter network 80. The mail server 70 may connect to the perimeter network 80 through a network interface unit 16 connected to the bus 10. It should be appreciated that the network interface unit 16 may also be utilized to connect to other types of networks and remote computing systems. The mail server 70 may also include an input/output controller 22 for receiving and processing input from a number of input types, including a keyboard, mouse, pen, stylus, finger, and/or other means. Similarly, an input/output controller 22 may provide output to a display device, a printer, or other type of output device. Additionally, a touch screen can serve as an input and an output mechanism. It should be appreciated that the server computer 76 and the directory servers 72 and 78 discussed above with respect to FIG. 1 may also include many of the conventional components shown with respect to the mail server 70 in FIG. 2.

Figure 3:
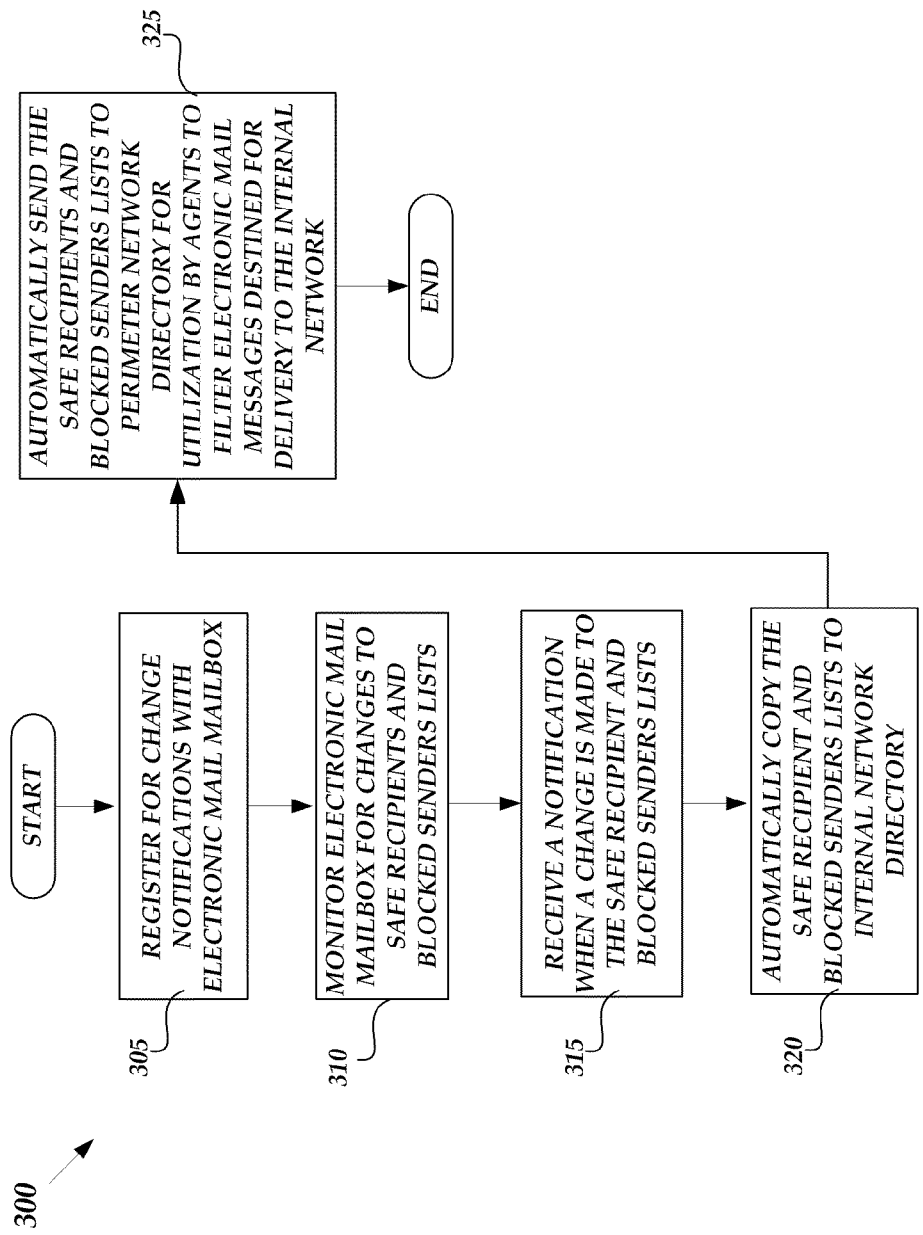
FIG. 3 is a flow diagram illustrating a routine for sending safe recipients and blocked senders lists from an internal network directory to a perimeter network so that the lists may be utilized by the perimeter network to filter electronic mail messages destined for the internal network, in accordance with an embodiment.

FIG. 3 is a flow diagram illustrating a routine 300 for sending safe recipients and blocked senders lists from an internal network directory to a perimeter network so that the lists may be utilized by the perimeter network to filter electronic mail messages destined for the internal network, in accordance with an embodiment. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIGS. 3-4 and making up the various embodiments described herein are referred to variously as operations, structural devices, acts or modules. It will be recognized by one skilled in the art that these operations, structural devices, acts and modules may be implemented in software, in firmware, in special purpose digital logical, and any combination thereof without deviating from the spirit and scope of the present invention as recited within the claims set forth herein.

The routine 300 begins at operation 305, where the mailbox agent 42 executing on the mail server 70 registers for change notifications with respect to the safe recipients list 35 and/or the blocked sender list 37 which are stored in the user's mailbox 30. In particular, the mailbox agent 42 may register with the user's mailbox 30 to be notified whenever the user 2 adds, removes, or modifies an address to the safe recipients list 35 and the blocked senders list 37. For example, the user 2 may add an address to the safe recipients list 35 to make sure that electronic mail messages received at that address are always delivered to the user 2. Conversely, the user 2 may add an address to the blocked senders list 37 to prevent electronic messages from being received if the user has previously received spam from that address.

From operation 305, the routine 300 continues to operation 310, where the mailbox agent 42 monitors the user's mailbox 30 for changes made to the safe recipients list 35 and/or the blocked senders list 37 by the user 2. From operation 310, the routine 300 continues to operation 315, where the mailbox agent 42 receives a notification when changes are made to the safe recipients list 35 and/or the blocked senders list 37.

From operation 315, the routine 300 continues to operation 320, where the synchronization component 44 may automatically copy the safe recipients list 35 and/or the blocked senders list 37 to the directory server 72. In particular, and as discussed above with respect to FIG. 1, the synchronization component 44 in automatically copying the lists 35 and/or 37 may be configured to compute an encrypted value, such as a hash value 39, for each entry in the lists 35 and/or 37 and then store the computed encrypted (e.g., hash) values in the directory server 72. Alternatively, as discussed above with respect to FIG. 1, the lists 35 and/or 37 may not undergo any encryption at all but rather are copied to the directory server 72 by the mailbox agent 42 "in the clear" in order to realize increased performance benefits in the internal network 60. In accordance with another embodiment, the lists 35 and/or 37 may not be copied to the directory server 72 but rather may be copied directly to the directory server 78 in the perimeter network 80.

From operation 320, the routine 300 continues to operation 325, where the synchronization component 44 automatically sends the safe recipients list 35 and/or the blocked senders list 37 (i.e., the hash values 39) to the directory server 78 in the perimeter network 80. As discussed above with respect to FIG. 1, the sender filtering agent 52 and the content filtering agent 54, executing on the server 76, may be configured to encrypt (e.g., generate a hash of) addresses in individual electronic mail messages received in the perimeter network 80 (e.g., from the Internet 4) and compare the result with the hash values 39 corresponding to the addresses in the lists 35 and/or 37 to filter electronic mail messages destined for delivery to the internal network 60. In accordance with other embodiments, the internal network 60 may directly face the Internet 4 in which case the synchronization component 44 is not utilized. In the aforementioned embodiments, the sender filtering agent 52 and the content filtering agent 54 may be hosted in the internal network 60. An illustrative routine describing filtering operations performed by the sender filtering agent 52 and the content filtering agent 54 will be described in greater detail below with respect to FIG. 4. From operation 325, the routine 300 then ends.

Figure 4:
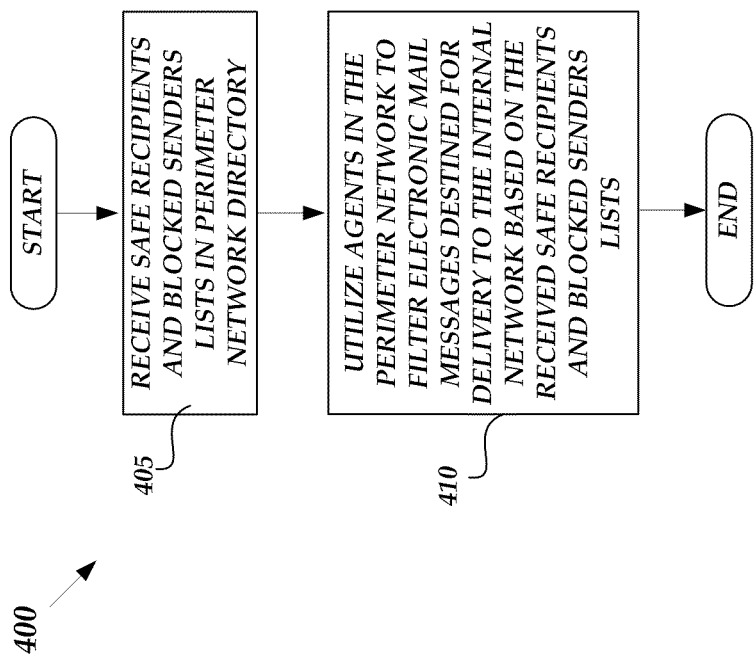
FIG. 4 is a flow diagram illustrating a routine for utilizing agents in a perimeter network to filter electronic mail messages destined for delivery to an internal network based on safe recipients and blocked senders lists received from the internal network, in accordance with an embodiment.

Turning now to FIG. 4, an illustrative routine for utilizing agents in a perimeter network to filter electronic mail messages destined for delivery to an internal network, based on safe recipients and blocked senders lists received from the internal network, will now be described in accordance with an embodiment. The routine 400 begins at operation 405, where the directory server 78 in the perimeter network 80 receives the safe recipients list 35 and/or the blocked senders list 37 in the form of the hash values 39 via the synchronization component 44 as described above with respect to FIG. 1.

From operation 405, the routine 400 continues to operation 410, where the sender filtering agent 52 and the content filtering agent 54 filter electronic mail messages destined for delivery to the internal network 60. In particular, the sender filtering agent 52 may be configured to generate hashes of addresses in the electronic mail messages received in the perimeter network 80 (e.g., from the Internet 4), compare the result with the hash values 39 corresponding to the addresses in the blocked senders list 37, which were copied from the directory server 72, and then reject electronic mail messages destined for recipients in the internal network 60 if a match is found as a result of the comparison. Similarly, the content filtering agent 54 may be configured to generate hashes of addresses in the electronic mail messages received in the perimeter network 80 (e.g., from the Internet 4), compare the result with the hash values 39 corresponding to the addresses in the safe recipients list 35, which were copied from the directory server 72, and then bypass spam filtering for electronic mail messages destined for recipients in the internal network 60 if a match is found as a result of the comparison. Thus, the content filtering agent 54 may utilize the addresses contained in the safe recipients list 35 to filter incoming electronic mail in the perimeter network received from the Internet 4, without utilizing spam filtering for the electronic mail messages. In particular, the content filtering agent 54 may be configured to ignore a spam confidence level algorithm utilized for messages having addresses not contained in the safe recipients list 35 or alternatively, skip generating a spam confidence level for messages having addresses which are contained in the safe recipients list 35.

In accordance with an embodiment, the sender filtering agent 52 may be configured to filter messages by analyzing the Multipurpose Internet Mail Extensions ("MIME") headers of incoming messages. For example, the sender filtering agent 52 may reject messages destined for the internal network 60 in which a sender's address or, alternatively, the domain portion of a sender's address, which appears in the "From:" or "Sender:" MIME header fields, matches an address (or portion of an address) specified in the blocked senders list 37. As another non-limiting example, the content filtering agent 54 may allow (i.e., bypass filtering) messages destined for the internal network 60 in which an address appearing in the "To:" or "Cc:" MIME header fields, matches an address specified in the safe recipients list 35. From operation 410, the routine 400 then ends.

Although the invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer-implemented method of filtering electronic mail messages destined for an internal network, comprising:
   monitoring, by the computer, an electronic mail mailbox for changes to at least one of a safe recipients list and a blocked senders list; and
   automatically sending, by the computer, the at least one of the safe recipients list and the blocked senders list to a network directory for utilization by at least one agent to filter received electronic mail messages destined for delivery to the internal network from a perimeter network, the internal network comprising a first local area network, the perimeter network comprising a second local area network, the first local area network being in communication with the second local area network through a firewall, the firewall located between the first local area network and the second local area network, the second local area network having direct access to a wide area network, the wide area network comprising the Internet, the first local area network not having direct access to the Internet, the first local area network comprising the safe recipients list and the blocked senders list, the second local area network not having direct access to the safe recipients list and the blocked senders list.

2. The method of claim 1, further comprising:
   registering for change notifications with a electronic mail mailbox;
   receiving a notification when at least one change is made to the at least one of the safe recipients list and the blocked senders list; and
   automatically copying, by the computer, the at least one of the safe recipients list and the blocked senders list to a network directory in the internal network.

3. The method of claim 2, wherein automatically copying, by the computer, the at least one of the safe recipients list and the blocked senders list to a network directory in the internal network comprises:
   computing an encrypted value for each entry in the at least one of the safe recipients list and the blocked senders list: and
   storing the encrypted values in the network directory in the internal network.

4. The method of claim 3, wherein automatically sending, by the computer, the at least one of the safe recipients list and the blocked senders list to a network directory for utilization by at least one agent to filter received electronic mail messages destined for delivery to the internal network comprises copying the encrypted values from the network directory in the internal network to a network directory in the perimeter network.

5. The method of claim 1, wherein monitoring, by the computer, an electronic mail mailbox for changes to at least one of a safe recipients list and a blocked senders list comprises monitoring changes to a list of recipient electronic mail addresses specified as safe in the safe recipients list.

6. The method of claim 1, wherein monitoring, by the computer, an electronic mail mailbox for changes to at least one of a safe recipients list and a blocked senders list comprises monitoring changes to a list of sender electronic mail addresses which are specified as addresses to be blocked from being received by a recipient.

7. The method of claim 1, wherein automatically sending, by the computer, the at least one of the safe recipients list and the blocked senders list to a network directory for utilization by at least one agent to filter received electronic mail messages destined for delivery to the internal network comprises sending the safe recipients list to a network directory in a perimeter network for utilization by a content filtering agent, wherein the content filtering agent sends electronic mail messages destined for the internal network which include an address specified in the safe recipients list, without utilizing spam filtering for the electronic mail messages.

8. The method of claim 1, wherein automatically sending, by the computer, the at least one of the safe recipients list and the blocked senders list to a network directory for utilization by at least one agent to filter received electronic mail messages destined for delivery to the internal network comprises sending the blocked senders list to a network directory in a perimeter network for utilization by a sender filtering agent, wherein the sender filtering agent rejects electronic mail messages destined for the internal network which include an address specified in the blocked senders list.

9. A computer system for filtering electronic mail messages destined for an internal network, comprising:
   a memory for storing executable program code; and
   a processor, functionally coupled to the memory, the processor being responsive to computer-executable instructions contained in the program code and operative:
      receive at least one of a safe recipients list and a blocked senders list in a network directory in a perimeter network; and
      utilize at least one agent in the perimeter network to filter electronic mail messages destined for delivery to the internal network based on the at least one of the safe recipients list and the blocked senders list in the perimeter network, the internal network comprising a first local area network, the perimeter network comprising a second local area network, the first local area network being in communication with the second local area network through a firewall, the firewall located between the first local area network and the second local area network, the second local area network having direct access to a wide area network, the wide area network comprising the Internet, the first local area network not having direct access to the Internet, the first local area network comprising the safe recipients list and the blocked senders list, the second local area network not having direct access to the safe recipients list and the blocked senders list.

10. The computer system of claim 9, wherein the processor, in utilizing at least one agent in the perimeter network to filter electronic mail messages destined for delivery to the internal network based on the at least one of the safe recipients list and the blocked senders list in the perimeter network is operative to utilize a content filtering agent to send electronic mail messages destined for the internal network which include an address specified in the safe recipients list, wherein the content filtering agent is operative to bypass filtering electronic mail messages having an address listed in at least one of a To: Multipurpose Internet Mail Extensions (MIME) header and a Cc: MIME header, which matches an address specified in the safe recipients list.

11. The computer system of claim 10, wherein the processor, in utilizing at least one agent in the perimeter network to filter electronic mail messages destined for delivery to the organization network based on the at least one of the safe recipients list and the blocked senders list in the perimeter network, is operative to utilize a sender filtering agent to reject electronic mail messages destined for the internal network, wherein the sender filtering agent is operative to reject electronic mail messages having at least one of a sender's address and a domain portion of the sender's address, specified in at least one of a From: MIME header and a Sender: MIME header, which matches an address specified in the blocked senders list.

12. The computer system of claim 11, wherein the content filtering agent and the sender filtering agent have direct access to the network directory in the perimeter network.

13. The computer system of claim 9, wherein the safe recipients list comprises a list of recipient electronic mail addresses specified as safe for delivery to the internal network.

14. The computer system of claim 9, wherein the blocked senders list comprises a list of sender electronic mail addresses specified as addresses to be blocked from delivery to the internal network.

15. The computer system of claim 9, wherein the processor, in receiving at least one of a safe recipients list and a blocked senders list to a network directory in the perimeter network is operative to receive a plurality of encrypted values corresponding to entries in the at least one of the safe recipients list and the blocked senders list from a network directory in the internal network.

16. A memory storage comprising computer executable instructions which, when executed by a mobile computing device, will cause the mobile computing device to perform a method of filtering electronic mail messages destined for an internal organizational network, the method comprising:
registering for change notifications with an electronic mail mailbox;
monitoring an electronic mail mailbox for changes to at least one of a safe recipients list and a blocked senders list;
receiving a notification when at least one change is made to the at least one of the safe recipients list and the blocked senders list;
automatically copying the at least one of the safe recipients list and the blocked senders list to a network directory in the internal organizational network in response to receiving the notification; and
automatically sending the at least one of the safe recipients list and the blocked senders list to a network directory in a perimeter network for utilization by at least one agent in the perimeter network to filter electronic mail messages received by the perimeter network destined for delivery to the internal organizational network, the internal organizational network comprising a first local area network, the perimeter network comprising a second local area network, the first local area network being in communication with the second local area network through a firewall, the firewall located between the first local area network and the second local area network, the second local area network having direct access to a wide area network, the wide area network comprising the Internet, the first local area network not having direct access to the Internet, the first local area network comprising the safe recipients list and the blocked senders list, the second local area network not having direct access to the safe recipients list and the blocked senders list.

17. The memory storage of claim 16, wherein automatically copying the at least one of the safe recipients list and the blocked senders list to a network directory in the internal organizational network in response to receiving the notification comprises:
computing a hash value for each entry in the at least one of the safe recipients list and the blocked senders list: and
storing the computed hash values in the network directory in the internal organizational network.

18. The memory storage of claim 17, wherein automatically sending the at least one of the safe recipients list and the blocked senders list to a network directory in the perimeter network for utilization by at least one agent in the perimeter network to filter electronic mail messages received by the perimeter network destined for delivery to the internal organizational network comprises:
copying the computed hash values from the network directory in the internal organizational network to the network directory in the perimeter network;
sending the safe recipients list to the network directory in the perimeter network for utilization by a content filtering agent, wherein the content filtering agent sends electronic mail messages destined for the internal organizational network which include an address specified in the safe recipients list, without utilizing spam filtering for the electronic mail messages; and
sending the blocked senders list to the network directory in the perimeter network for utilization by a sender filtering agent, wherein the sender filtering agent rejects electronic mail messages destined for the internal organizational network which include an address specified in the blocked senders list.

19. The memory storage of claim 16, wherein monitoring an electronic mail mailbox for changes to at least one of a safe recipients list and a blocked senders list comprises monitoring changes to a list of recipient electronic mail addresses specified as safe in the safe recipients list.

20. The memory storage of claim 16, wherein monitoring an electronic mail mailbox for changes to at least one of a safe recipients list and a blocked senders list comprises monitoring changes to a list of sender electronic mail addresses which are specified as addresses to be blocked from being received by a recipient.

* * * * *